US008072493B2

(12) United States Patent
Stuecker

(10) Patent No.: US 8,072,493 B2
(45) Date of Patent: Dec. 6, 2011

(54) SECURITY SYSTEM

(76) Inventor: Barry Stuecker, Phoenix, AZ (US)

( * ) Notice: Subject to any disclaimer, the term of this patent is extended or adjusted under 35 U.S.C. 154(b) by 337 days.

(21) Appl. No.: 12/091,163

(22) PCT Filed: Nov. 2, 2006

(86) PCT No.: PCT/US2006/042810

§ 371 (c)(1), (2), (4) Date: Apr. 22, 2008

(87) PCT Pub. No.: WO2007/056060

PCT Pub. Date: May 18, 2007

(65) Prior Publication Data

US 2008/0225120 A1 Sep. 18, 2008

Related U.S. Application Data

(60) Provisional application No. 60/733,419, filed on Nov. 3, 2005.

(51) Int. Cl.
*H04N 7/18* (2006.01)

(52) U.S. Cl. ........................................ 348/155; 348/143

(58) Field of Classification Search ........... 348/143–169
See application file for complete search history.

(56) References Cited

U.S. PATENT DOCUMENTS

| | | | | |
|---|---|---|---|---|
| 4,963,854 | A | 10/1990 | Stuecker | |
| 5,045,839 | A * | 9/1991 | Ellis et al. | 340/539.11 |
| 5,731,832 | A * | 3/1998 | Ng | 348/155 |
| 5,777,551 | A | 7/1998 | Hess | |
| 5,818,127 | A | 10/1998 | Abraham | |
| 6,433,683 | B1 * | 8/2002 | Robinson | 340/540 |
| 6,441,731 | B1 | 8/2002 | Hess | |
| 6,812,970 | B1 * | 11/2004 | McBride | 348/372 |
| 7,236,185 | B2 | 6/2007 | Terada et al. | |

(Continued)

FOREIGN PATENT DOCUMENTS

| | | | |
|---|---|---|---|
| DE | 3910514 | A1 | 10/1990 |
| DE | 20115873 | U1 | 12/2001 |
| EP | 0986038 | A2 | 3/2000 |
| EP | 1316933 | A2 | 6/2003 |
| GB | 2400911 | A | 10/2004 |
| WO | WO2004079684 | A1 | 9/2004 |

*Primary Examiner* — David Czekaj

(74) *Attorney, Agent, or Firm* — Parsons & Goltry; Michael W. Goltry; Robert A. Parsons

(57) ABSTRACT

A security system (10) includes an alternating electric current powered motion sensor assembly (30), and a direct electric powered security module (31) incorporating a storage device (63). A digital camera includes a digital camera mechanism (50) associated with the security module (31), and a digital camera lens (51) associated with the motion sensor assembly (30). Wiring (20) coupled between the motion sensor assembly (30) and the security module (31) provides alternating current to the motion sensor assembly (30) and the security module (31). A transformer (61) converts the alternating current from the wiring (20) to direct current electric and supplies the direct current to the security module (31). The digital camera mechanism (50) is responsive to activation of the motion sensor assembly (30) detecting motion in a vicinity (12) of the motion sensor assembly (30) activating the camera lens (51) to make digital imagery of an area in the vicinity (12), receiving the digital imagery made by the camera lens (51) over the wiring (20), and storing the digital imagery in the storage device (63).

7 Claims, 4 Drawing Sheets

U.S. PATENT DOCUMENTS

| | | | | |
|---|---|---|---|---|
| 7,253,732 | B2 * | 8/2007 | Osann, Jr. | 340/541 |
| 2003/0081122 | A1 * | 5/2003 | Kirmuss | 348/148 |
| 2003/0210340 | A1 | 11/2003 | Romanowich | |
| 2004/0212677 | A1 | 10/2004 | Uebbing | |
| 2004/0212678 | A1 | 10/2004 | Cooper et al. | |
| 2005/0018766 | A1 * | 1/2005 | Iwamura | 375/240.01 |
| 2005/0262519 | A1 | 11/2005 | Luebke et al. | |
| 2006/0203101 | A1 | 9/2006 | Silsby | |

* cited by examiner

FIGURE 3
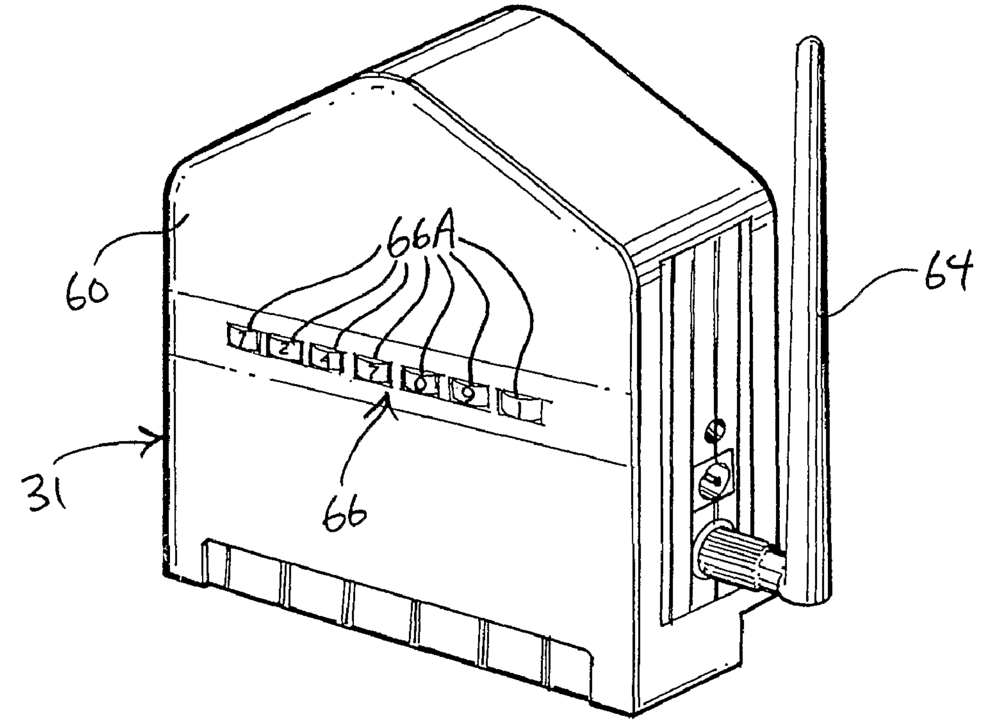
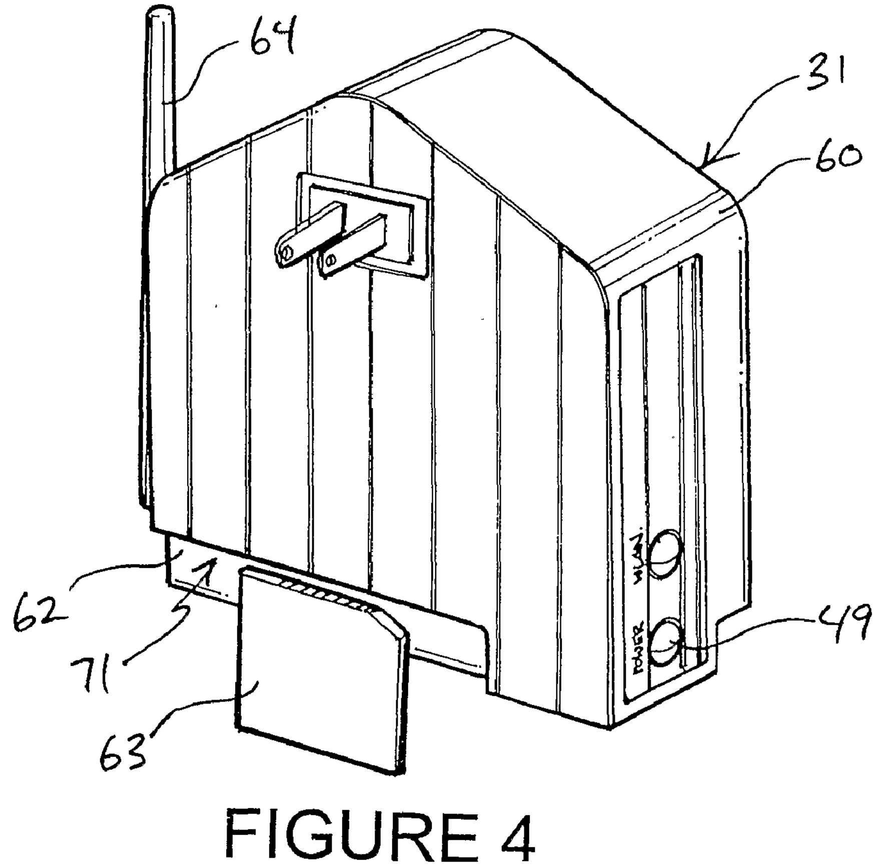
FIGURE 4

SECURITY SYSTEM

TECHNICAL FIELD

The present invention relates to premises security systems and methods.

BACKGROUND ART

Security is the condition of being protected against danger or loss. In the general sense, security is a concept similar to safety. The nuance between the two is an added emphasis on being protected from dangers that originate from outside. Individuals or actions that encroach upon the condition of protection are responsible for the breach of security.

There is an immense literature on the analysis and categorization of security. Part of the reason for this is that, in most security systems, the "weakest link in the chain" is the most important. The situation is asymmetric since the defender must cover all points of attack while the attacker can simply identify a single weak point upon which to concentrate their efforts.

Premises security describes measures that prevent or deter attackers or intruders from accessing a home or business. Due to the importance people assign to premises security for protecting their possessions and loved ones from potential intruders, skilled artisans have developed numerous security systems design to provide various measures of security in and around vicinities of buildings including homes and businesses. Although existing security systems are adequate, they are expensive, difficult to install, often require the services of specialized offsite security monitoring stations, and are not easily scalable or adaptable to meet changing security needs. Given these and other deficiencies in the art, the need for continuing improvement in the art of premises security is evident.

DISCLOSURE OF THE INVENTION

According to the invention, a security system consists of a digital camera including a digital camera mechanism operatively coupled to a digital camera lens. An alternating current electric powered motion sensor assembly includes a motion sensor and the digital camera lens. Direct current electric powered components are provided, which include a cellular transceiver operatively coupled to a storage device, the digital camera mechanism operatively coupled to the storage device, and a transformer operatively coupled to the cellular transceiver, the storage device, and the digital camera mechanism. Wiring coupled between the motion sensor assembly and the transformer provides alternating current electric power to the motion sensor assembly and to the transformer and operatively couples the digital camera mechanism to the motion sensor and the digital camera lens. The transformer converts the alternating current electric power from the wiring to direct current electric power and supplies the direct current electric power to the cellular transceiver, the digital camera mechanism, and the storage device. The digital camera mechanism is responsive to activation of the motion sensor detecting motion in a vicinity of the motion sensor activating the camera lens to make digital imagery of an area in the vicinity, receiving the digital imagery made by the camera lens over the wiring, and storing the digital imagery in the storage device. The cellular transceiver is adapted to retrieve the stored digital imagery from the storage device and transmit the stored digital imagery to a cellular appliance across a cellular telephonic network. Preferably, the cellular appliance is a cellular phone. In one embodiment, the motion sensor assembly, the components, and the wiring are incorporated in a vehicle, and the vicinity is defined proximate the vehicle. In another embodiment, the motion sensor assembly, the components, and the wiring are incorporated in a building, and the vicinity is defined proximate the building. A light source is operatively coupled to the motion sensor and activates in response to activation of the motion sensor detecting motion in the vicinity of the motion sensor for illuminating the vicinity. In another embodiment, an audible alarm device is operatively coupled to the motion sensor and activates in response to activation of the motion sensor detecting motion in the vicinity of the motion sensor for issuing an audible stimulus at the vicinity. In one embodiment, the digital camera is capable of collecting still digital images, and the stored digital imagery consists of stored still digital imagery. In another embodiment, the digital camera is capable of collecting video digital images, and the stored digital imagery consists of stored video digital imagery. An authentication protocol incorporated with the cellular transceiver provides controlled access to the cellular transceiver by the cellular appliance.

According to the invention, a security system consists of a digital camera including a digital camera mechanism operatively coupled to a digital camera lens. An alternating current electric powered motion sensor assembly is also provided, which includes a motion sensor and the digital camera lens, as is a direct current electric powered self-contained security module. The security module includes a cellular transceiver operatively coupled to a storage device, the digital camera mechanism operatively coupled to the storage device, and a transformer operatively coupled to the cellular transceiver, the storage device, and the digital camera mechanism. Wiring coupled between the motion sensor assembly and the security module provides alternating current electric power to the motion sensor assembly and to the security module. The wiring operatively couples the digital camera mechanism to the motion sensor and the digital camera lens. The transformer converts the alternating current electric power from the wiring to direct current electric power and supplies the direct current electric power to the security module. The digital camera mechanism is responsive to activation of the motion sensor detecting motion in a vicinity of the motion sensor activating the camera lens to make digital imagery of an area in the vicinity, receiving the digital imagery made by the camera lens over the wiring, and storing the digital imagery in the storage device. The cellular transceiver is adapted to retrieve the stored digital imagery from the storage device and transmit the stored digital imagery to a cellular appliance across a cellular telephonic network. Preferably, the cellular appliance is a cellular phone. In one embodiment, the motion sensor assembly, the security module, and the wiring are incorporated in a vehicle, and the vicinity is defined proximate the vehicle. In another embodiment, the motion sensor assembly, the security module, and the wiring are incorporated in a building, and the vicinity is defined proximate the building. A light source is operatively coupled to the motion sensor and activates in response to activation of the motion sensor detecting motion in the vicinity of the motion sensor for illuminating the vicinity. In another embodiment, an audible alarm device is operatively coupled to the motion sensor and activates in response to activation of the motion sensor detecting motion in the vicinity of the motion sensor for issuing an audible stimulus at the vicinity. In one embodiment, the digital camera is capable of collecting still digital images, and the stored digital imagery consists of stored still digital imagery. In another embodiment, the digital camera is capable of collecting video digital images, and the stored digital imagery consists of stored video digital imagery. Preferably, an electrical outlet couples the wiring to the security module. An authentication protocol is incorporated with the cellular transceiver, which provides controlled access to the cellular transceiver by the cellular appliance.

Consistent with the foregoing summary of preferred embodiments, and the ensuing detailed description, which are to be taken together, the invention also contemplates associated embodiments.

BRIEF DESCRIPTION OF THE DRAWINGS

Referring to the drawings:

FIG. 3 is an enlarged front perspective view of a security module of the security system of FIG. 1;

FIG. 4 is an enlarged rear perspective view of the security module of FIG. 3;

BEST MODES FOR CARRYING OUT THE INVENTION

Figure 1:
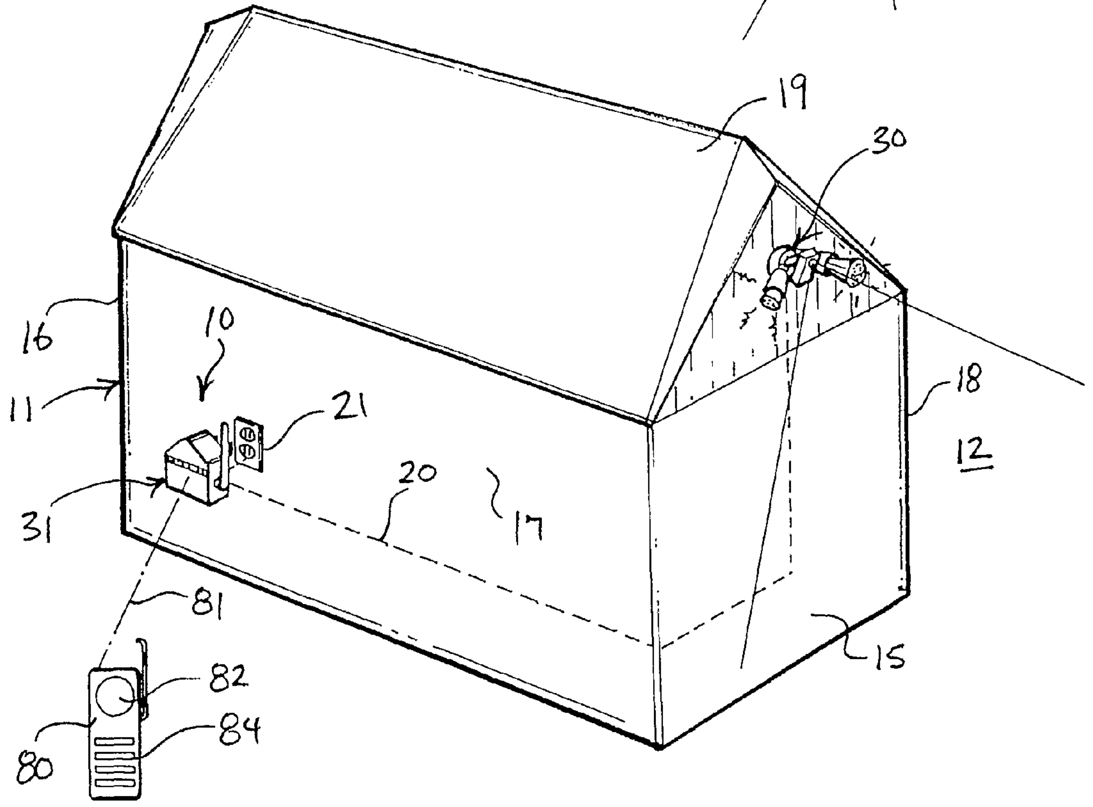
FIG. 1 is a partially schematic perspective view of a security system incorporated with a building for providing security in a vicinity of the building, the security system constructed and arranged in accordance with the principle of the invention.

Turning now to the drawings, in which like reference characters indicate corresponding elements throughout the several views, attention is first directed to FIG. 1 in which there is seen a partially schematic perspective view of a security system 10 incorporated with a building 11 for providing security in a vicinity 12 of building 11. In FIG. 1, building 11 is a man-made structure used or intended for supporting or sheltering any use or continuous occupancy, and is constructed of conventional and readily available building materials and techniques. For orientation and reference purposes, building has opposed front and rear ends 15 and 16 and opposed sides 17 and 18 formed by upstanding walls, and a roof 19 forming the top covering of building 11, the purpose of which is primarily to shed water from building 11 and to shelter the interior of building 11. According to conventional practice, building 11 is fashioned with electrical wiring for conducting alternating current electric power throughout building and to conventional electrical outlets designed to accept electrical plugs of electrical appliances within building 11. For reference purposes, the alternating current electrical wiring is denoted at 20 in FIG. 1, which is wired in a conventional manner to a conventional electrical outlet 21. In the present embodiment, outlet 21 is situated at side 17 of building 11 and is located exteriorly of building 11. The location of outlet 21 is illustrated only as a matter of example, and it is to be understood that outlet 21 may be located at any suitable location relative to building 11, whether at side 17, side 18, front end 15, rear end 16, or elsewhere, whether at an exterior location relative to building 11 or an interior location relative to building 11.

Set forth for purposes of illustration and reference in connection with the ensuing detailed description of the preferred embodiment of the present invention, the foregoing brief description of building 11 is intended to be generally representative of a typical building. Details not specifically illustrated and described will be readily understood and appreciated by those skilled in the art.

According to the principle of the invention, security system 10 includes an alternating current electric powered motion sensor assembly 30, and a direct current electric powered security module 31. Motion sensor assembly 30 is wired conventionally to wiring 20, receives and operates off of alternating current electric power provided by wiring 20, and in the present example is mounted exteriorly of building in a conventional manner, such as with screws or other selected mechanical fasteners, to front 15 of building 11 adjacent to roof 19, in which vicinity 12 is located in and around the exterior area surrounding front 15 of building 11. The location of motion sensor assembly 30 at front 15 of building 11 providing security at vicinity 12 is set forth as a matter of example, and it is to be understood that motion sensor assembly 30 can be mounted exteriorly of building 11 at any suitable location for providing securing of any designated vicinity exteriorly of building 11. Furthermore, although motion sensor assembly 30 is mounted exteriorly of building 11 for providing security in vicinity 12 exteriorly of building, motion sensor assembly 13 can, if desired, be mounted interiorly of building 12 for providing security of a vicinity inside of, or otherwise interiorly of, building 11.

Motion sensor assembly 30 consists of a wall-mounted electrical fixture 40 that supports a conventional motion sensor 41 and opposed electric sockets 42 and 43. An audible alarm device 44 is fitted in socket 42, and a light bulb 45 is fitted in socket 43. Light bulb 45, which constitutes a light source, is operatively coupled to motion sensor 41 and activates in response to activation of motion sensor 41 detecting motion in vicinity 12 of motion sensor 41 for illuminating vicinity 12 for the purpose of illuminating authorized activity or intrusion in vicinity 12 and to alert others to the possibility of unauthorized activity or intrusion in vicinity 12 indicated by motion in vicinity 12 detected by motion sensor 41. Audible alarm device 44 is operatively coupled to motion sensor 41 and activates in response to activation of motion sensor 41 detecting motion in vicinity 12 of motion sensor 41 for issuing an audible stimulus at vicinity 12 for the purpose of scaring off unauthorized activity or intrusion in vicinity 12 and to alert others to the possibility of unauthorized activity or intrusion in vicinity 12 indicated by motion in vicinity 12 detected by motion sensor 41. Motion sensor 41 is fashioned with sensitivity controls 46 used to control the motion sensing sensitivity of motion sensor 41 in conjunction with the operation of motion sensor 41 with light bulb 45, in order to have motion sensor 41 function in the normal manner in the light fixture mode only, and sensitivity controls 47 used to control the motion sensing sensitivity of motion sensor 41 in conjunction with the operation of motion sensor 41 with audible alarm device 44, in order to have motion sensor 41 function in the normal manner in the audible alarm mode only. Controls 46 and 47 are each identical in that they are configured to adjust the range of motion sensor 41, the time duration that motion sensor 41 is active, and light sensitivity to enable 24-hour and/or night-time operation of motion sensor 41.

Set forth for purposes of illustration and reference in connection with the detailed description of the preferred embodiment of the present invention, the foregoing brief description motion sensor assembly 30 is intended to be generally representative of a typical motion sensor assembly 30. Motion sensor 30 herein set forth for illustrative purposes is a readily available and well-known device. Audible alarm device 44 of motion sensor assembly 30 is a readily available item offered for sale and sold under the exemplary BUZZ BULB trademark, and which is disclosed in U.S. Pat. No. 4,963,854, which is incorporated herein by reference. Further details of motion sensor assembly 30 not specifically illustrated and described will be readily understood and appreciated by those skilled in the art.

In the present embodiment, motion sensor assembly 30 incorporates one light bulb 45 as the light source, and one audible alarm device 44 as the audible alarm source. Those having regard for the art will readily appreciate that more than one light bulb may be used to constitute the light source, and that more than one audible alarm device may be utilized as the audible alarm source without departing from the invention.

According to the principle of the invention, security system 10 incorporates a digital camera, including a digital camera mechanism 50 operatively coupled to a digital camera lens 51. Lens 51 is built into or otherwise integrated into motion sensor assembly 30 and, like the remaining components of motion sensor assembly 30, receives and operates off of alternating current electric power provided by wiring 20. Lens 51 is entirely conventional, and is used in conjunction with digital camera mechanism 50 to make digital images or imagery for storage. The digital camera is preferably multifunctional, and is capable of recording not only still digital imagery, e.g. still digital photographs, but also video digital imagery, e.g., video. The digital camera is also of the type that is capable of incorporating time-and-date stamp data with the digital imagery collected thereby. In the present embodiment, digital camera mechanism 50 is incorporated with security module 31, and lens 51 is built into or otherwise integrated into motion sensor 41 in a conventional manner utilizing readily available electronic component-incorporating techniques commonly used in conjunction with incorporating digital cameras into cellular phones and other forms of electronic devices. Consistent with the teachings of the present invention, lens 51 can be situated at other locations relative to motion sensor assembly 30, if desired.

Figure 5:
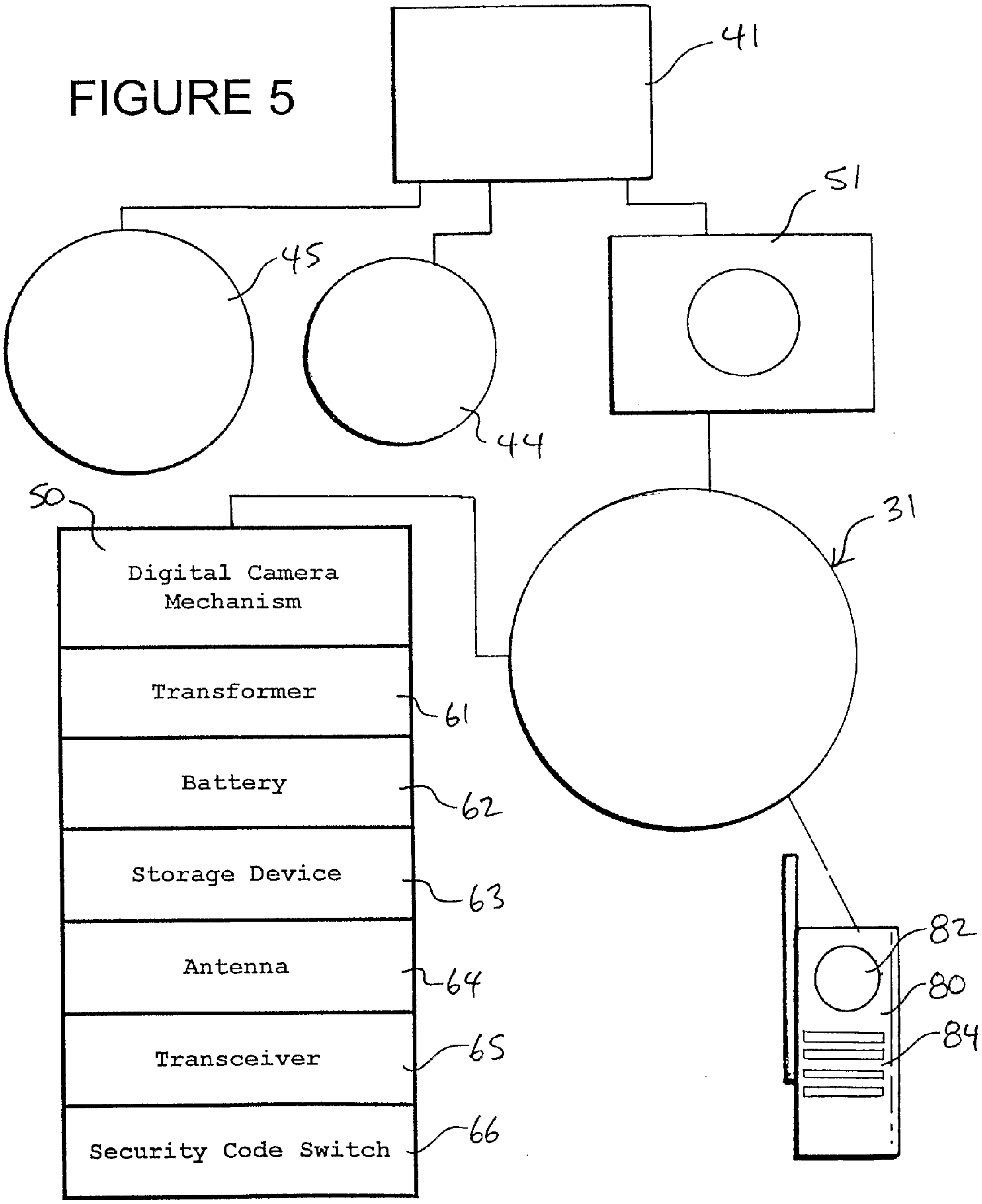
FIG. 5 is a schematic representation of the security system of FIG. 1.

Referring to FIG. 3, which is an enlarged front perspective view of security module 31, and FIG. 4, which is an enlarged rear perspective view of security module 31, security module 31 is a self-contained unit consisting of a housing 60 that forms the supporting structure for the various components of security module 31, which include, as illustrated in FIG. 5, digital camera mechanism 50, transformer 61, a battery 62, a storage device 63, an antenna 64, a cellular transceiver 65, and a security code switch 66, all of which are operatively coupled together utilizing conventional electronic integration techniques. Security module 31 operates off of direct current electric power, and incorporates a conventional electrical plug 70, which is plugged into outlet 21 of building 11 as generally illustrated in FIG. 1, thereby coupling security module 31 to the alternating current electric power provided by wiring 20. Plug 70 is coupled directly to transformer 61, which converts the alternating current electric power from wiring 20 to direct current electric power and directs or otherwise supplies the direct current electric power to operate the components of security module, including digital camera mechanism 50, storage device 63, antenna 64, cellular transceiver 65, and security code switch 66. Battery 62 provides direct current electric power to operate security module 31 in the event the alternating current electric power provided by wiring 20 is interrupted. Battery 62 consists of one or more conventional primary cell batteries, or one or more rechargeable batteries, which may be continuously recharged during the normal operation of security module 31. As seen in FIG. 4, security module 31 incorporates a power switch 49 for turning security module 31 ON and OFF.

Figure 2:
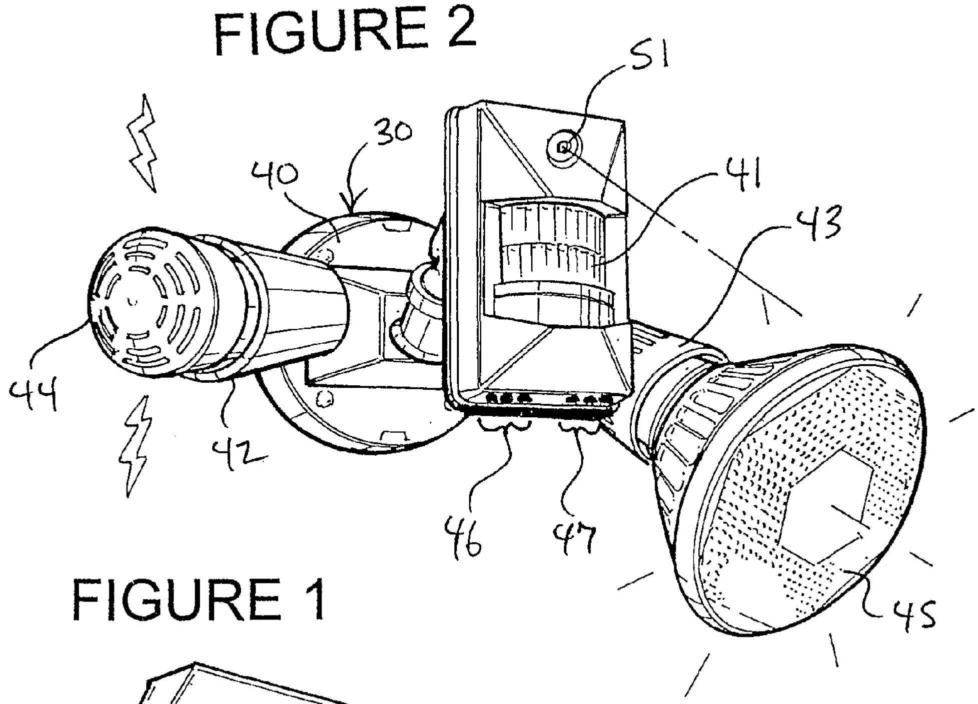
FIG. 2 is an enlarged perspective view of a motion sensor assembly of the security system of FIG. 1.

In operation according to the invention, and with reference in relevant part to FIGS. 1, 2, and 5, digital camera mechanism 50 is operatively coupled to lens 51, whereby digital camera mechanism 50 is associated with security module 31, and lens 51 is associated with motion sensor assembly 30. As to security module 31, cellular transceiver 65 is operatively coupled to storage device 63, digital camera mechanism 50 is operatively coupled to storage device 63, and transformer 61 is operatively coupled to cellular transceiver 65, storage device 63, and digital camera mechanism 50, all utilizing conventional electrical interconnections well-known to those having ordinary skill utilizing readily available techniques. Wiring 20 coupled between motion sensor assembly 30 and transformer 61 provides alternating current electric power to motion sensor assembly 30 and to transformer 61, and operatively couples digital camera mechanism 50 to motion sensor assembly 30, including motion sensor 41 and lens 51. Transformer 61 converts the alternating current electric power from wiring 20 to direct current electric power and supplies the direct current electric power to the components of security module 31, including digital camera mechanism 50, storage device 63, antenna 64, cellular transceiver 65, and security code switch 66.

Digital camera mechanism 50 responsive to activation of motion sensor 41 detecting motion in vicinity 12 (FIG. 1) of motion sensor 41 activating lens 51 to make digital imagery, e.g., taking one or more digital photographs/images and/or taking digital video footage/imagery, of the area in or of vicinity 12, receiving the digital imagery made by lens 51 over wiring 20, and storing the digital imagery in storage device 63. Cellular transceiver 65 is, in turn, adapted to retrieve the stored digital imagery from storage device 63 and transmit the stored digital imagery to, as referenced in FIG. 1, a cellular appliance 80 across a cellular telephonic network designated generally at 81.

Digital imagery taken by lens 51 is sent to digital camera mechanism 50 over wiring 20 for storage in storage device 63, and wiring 20 provides the operative coupling between digital camera mechanism 50 and lens 51 and the means by which digital imagery is transferred between lens 51 and digital camera mechanism 50. Storage device 63 is electronic storage in the form of a compact flash drive received in a port 71 (FIG. 4) formed in housing 60. Other suitable forms of electronic storage devices can be used in conjunction with module 31 without departing from the invention including, for instance, a microdrive, a memory stick, a mini SD card, a micro SD card, an XD-picture card, a zip drive, a bluetooth device, etc. Storage device 63 is preferably a removable storage device allowing it to be replaced when need with a fresh storage device, and transported to a secure or other desired location for retrieval, such as by a computer, and reproduction of the imagery stored thereon. Preferably, all digital imagery is date and time stamped by digital camera mechanism 50 for reference purposes.

Cellular transceiver 65 is adapted to retrieve the collected digital imagery from storage device 63 and transmit the collected digital imagery for viewing to cellular appliance 80 illustrated in FIGS. 1 and 5 across cellular telephonic network denoted generally at 81. Antenna 64 facilitates reliable communication between cellular transceiver 65 and cellular network 81. Cellular appliance 80 incorporates an electronic viewing screen 82, which is used to display the collected digital imagery transmitted from cellular transceiver 65. In this specific embodiment, cellular appliance 80 consists of a cellular phone, although cellular appliance 80 may consist of a personal digital assistant (PDA), a pager, or other selected cellular appliance adapted to communicate with cellular telephonic network 81 and which is configured with a viewing screen capable of displaying digital imagery.

In a particular embodiment, cellular transceiver 65 is programmed to issue a call to cellular appliance 80 in response to when digital imagery is received by storage device 63. The call is a preprogrammed, automated call, such as a prerecorded voice call, text message call, or page, or the like, which, when received or answered by the user of cellular appliance 80, informs the user of cellular appliance 80 that digital images have been received and stored in storage device 63 from digital camera mechanism 50, which, of course, alerts the user of cellular appliance 80 of the possibility of unauthorized activity and/or intrusion at vicinity 12. In response to cellular appliance 80 receiving a call from cellular transceiver 65, commands may be issued to cellular transceiver 65 from cellular appliance 80 through the operation of cellular appliance 80 to access storage device 63 for the purpose of retrieving and viewing the digital imagery from storage device 63. Together with the call issued by cellular transceiver 65, cellular transceiver 65 may be configured to concurrently transmit the digital imagery to cellular appliance 80 for viewing upon answering of the call by cellular appliance 80. Through the operation of cellular appliance 80, the digital imagery maintained by storage device 63 can be viewed as desired, deleted as desired, retained for later use, or retransmitted from cellular appliance 80 to another cellular appliance, to a computer via email, etc.

Preferably, the light source of motion detector assembly 30, e.g., light bulb 45, activates substantially concurrently with the activation of digital camera mechanism 50 in response to activation of motion sensor 41 detecting motion in vicinity 12 of motion sensor for illuminating vicinity 12 allowing the digital camera, including digital camera mechanism 50 and lens 51, to collect clear, illuminated digital imagery in and around vicinity 12. Also, like any cellular transceiver, cellular transceiver 65 is assigned a designated phone number, as is cellular appliance 80. When cellular transceiver 65 issues a call to cellular appliance 80, cellular transceiver 65 automatically dials the number assigned to cellular appliance 80. At any time, a call may be made to cellular transceiver 65, whether from cellular appliance 80 or other telephonic device, for the purpose of accessing storage device 63 and any imagery stored thereon.

Preferably, an authentication protocol is incorporated with and between cellular transceiver 65 and cellular appliance 80, which provides controlled and authorized access between cellular transceiver 65 and cellular appliance 80. When a call is made to cellular appliance 80 from cellular transceiver 65, or to cellular transceiver 65 from cellular appliance 80 or other telephonic device, the designated password is input into cellular transceiver 65 from cellular appliance 80 or other telephonic device for ensuring secure and authorized access to storage device 63, according to the principle of the invention. The authentication protocol is a conventional password protocol, which, in the present embodiment, is set by security code switch 66 set forth in FIG. 3. Code switch 66 is a conventional rotary code switch array incorporated into housing 60 incorporating a plurality of dials 66A each of which is set to a specified number or letter, and which is input into cellular transceiver 65 from cellular appliance 80, such as from a keypad 84 (FIGS. 1 and 5), to provide controlled, authorized access by cellular appliance 80 to the digital imagery maintained in storage device 63 via cellular transceiver 65. The designated password set by code switch 66 can easily be changed at any time. Moreover, it is to be understood that any suitable secure, password-based authentication protocol can be used between cellular transceiver 65 and cellular appliance 80 to provide controlled and authorized access therebetween without departing from the invention.

Referring to FIG. 2, controls 46 and 47 are preferably coupled together with an A-B switch (not shown) that may be controlled from security module 31. The control settings of controls 46 and 47 for motion sensor 41 may be input into security module 31 from cellular appliance 80 and sent from security module 31 over wiring 20 to controls 46 and 47 for altering the operation of motion sensor 41.

Those having regard for the art will readily appreciate that an exemplary security system has been disclosed, which is easy to make, easy and convenient to use, which has industrial applicability in providing premises security in and around buildings and providing digital imagery of potential intruders for use by police in capturing or identifying potential suspects. Because security module 31 is adapted to simply be plugged in to a conventional electrical outlet, it may be easily replaced as needed, and plugged into any desired electrical outlet providing a great level of convenience and adaptability. Although security system 10 incorporates one motion detector assembly, in can be configured with more, if desired, in conjunction with one security module 31 or a plurality of security modules 31, all for the purpose of redundancy and for providing the desired level of premises security for one or more designated vicinities.

The invention has been described above with reference to a preferred embodiment. However, those skilled in the art will recognize that changes and modifications may be made to the embodiment without departing from the nature and scope of the invention. For instance, although motion detector assembly 30 incorporates one digital camera lens, it can include more, if desired. If a plurality of lenses is used in conjunction with the digital camera of security system 10, an internal switching device may be incorporated between digital camera mechanism 50 and the lenses for enabling an interface between digital camera mechanism 50 and the lenses. Furthermore, digital the digital camera lens of the digital camera of security system 10 may be configured with a lens array for providing enhanced coverage a specified vicinity. If desired, a digital camera used in conjunction with a security system constructed and arranged in accordance with the principle of the invention may be configured with a plurality of plug in lenses for providing enhanced coverage of a specified vicinity, or a plurality of plug-ins each capable of receiving a camera lens or camera lens module.

Figure 6:
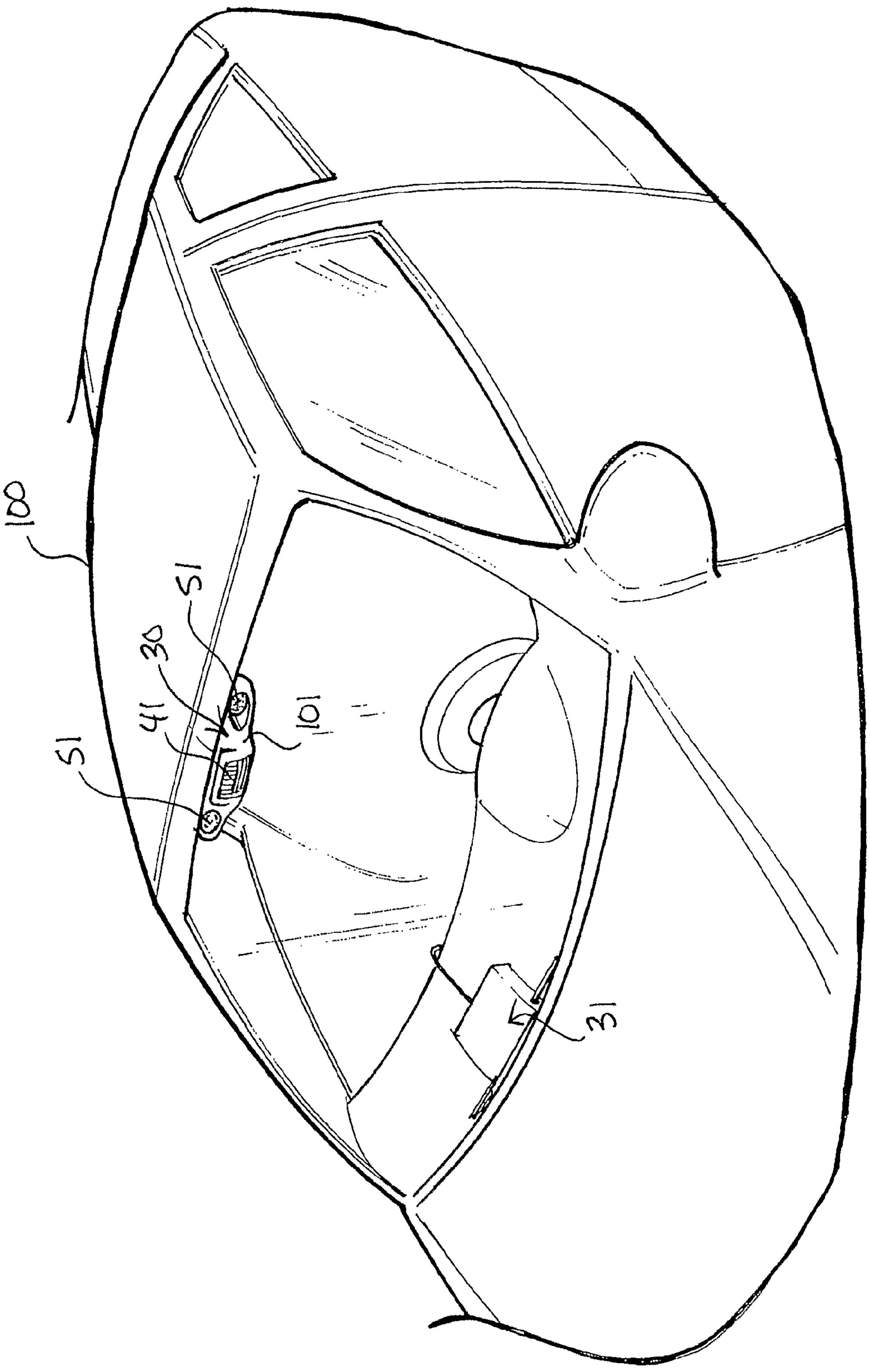
FIG. 6 is fragmented perspective view of a vehicle incorporating a security system constructed and arranged in accordance with the principle of the invention.

Furthermore, although motion detector assembly 30 incorporates a light source and an audible alarm device that each activate in response to activation of motion sensor 41, the light source and audible alarm device may each be omitted, if desired, in an alternate embodiment. Moreover, although security system 10 is illustrated in conjunction with building 11, it may be incorporated with any facility or thing for providing the designated security of a specified vicinity without departing from the invention. To illustrate this point, FIG. 6 is a fragmented perspective view of a vehicle 100 incorporating a security system 10 as previously discussed, including motion detector assembly 30, including a housing 101 supporting motion detector 41 and, rather than one, two digital camera lenses 51, and security module 31, which are coupled to the alternating current wiring (not shown) incorporated into vehicle 100. In FIG. 6, security module 31 is mounted on dashboard 102 of vehicle 100, although it may be mounted at any suitable location. Furthermore, motion detector assembly 30 is mounted interiorly of vehicle 100 on the interior of roof 105 of vehicle adjacent to the top of windshield 106, whereby motion sensor 41 detects motion and activates the digital camera in response thereto for taking digital imagery of the vicinity in and around vehicle 100 for storage and subsequent transmission purposes.

As before, any number of digital camera lenses may be utilized in security system 10 incorporated with vehicle 100, which may be located or pointed in any suitable direction for taking digital imagery of the vicinity within vehicle 100 and outside vehicle 100 as may be desired. Furthermore, security system 10 is incorporated with the alternating current wiring of vehicle 100 in a conventional manner, such as by conventional electrical wiring or plugs or the like. Since most vehicles now incorporate built-in vehicle security systems, security system 10 may be incorporated with the existing vehicle security system 10 of a vehicle and made to activate and function in the normal manner in response to activation of the vehicle security system, if desired. A security system constructed and arranged in accordance with the principle of the invention may be incorporated with any form of vehicle.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A security system, comprising:

a building incorporating alternating current electric wiring wired between an electrical fixture and an electrical outlet;

an alternating current electric powered motion sensor assembly supported by the electrical fixture and wired to the alternating current electric wiring of the building, the alternating current electric powered motion sensor assembly including a motion sensor and a digital camera lens;

a direct current electric powered self-contained security module, the security module including a plug, a cellular transceiver operatively coupled to a storage device, a digital camera mechanism operatively coupled to the storage device, and a transformer operatively coupled to the cellular transceiver, the storage device, and the digital camera mechanism;

the plug of the security module plugged into the electrical outlet of the building coupling the security module to the alternating current electric wiring of the building;

the alternating current electric wiring wired between the electrical fixture and the electrical outlet providing alternating current electric power to the motion sensor assembly and to the security module, and operatively coupling the digital camera mechanism to the motion sensor and to the digital camera lens;

the transformer converting the alternating current electric power from the wiring to direct current electric power and supplying the direct current electric power to the security module;

the digital camera mechanism responsive to activation of the motion sensor detecting motion in a vicinity of the motion sensor activating the camera lens to make digital imagery of an area in the vicinity, receiving the digital imagery made by the camera lens over the wiring, and storing the digital imagery in the storage device; and the cellular transceiver adapted to retrieve the stored digital imagery from the storage device and transmit the stored digital imagery to a cellular appliance across a cellular telephonic network.

2. The security system according to claim 1, wherein the cellular appliance comprises a cellular phone.

3. The security system according to claim 1, further comprising a light source operatively coupled to the motion sensor and which activates in response to activation of the motion sensor detecting motion in the vicinity of the motion sensor for illuminating the vicinity.

4. The security system according to claim 1, further comprising an audible alarm device operatively coupled to the motion sensor and which activates in response to activation of the motion sensor detecting motion in the vicinity of the motion sensor for issuing an audible stimulus at the vicinity.

5. The security system according to claim 1, wherein the digital imagery comprises still digital imagery.

6. The security system according to claim 1, wherein the digital imagery comprises video digital imagery.

7. The security system according to claim 1, further comprising an authentication protocol incorporated with the cellular transceiver providing controlled access to the cellular transceiver by the cellular appliance.

* * * * *